United States Patent
Chen et al.

(10) Patent No.: US 7,821,455 B2
(45) Date of Patent: Oct. 26, 2010

(54) HYBRID GPS RECEIVING METHOD AND ASSOCIATED APPARATUS

(75) Inventors: Shoufang Chen, Hsinchu Hsien (TW); Ying-Lin Lai, Taipei (TW); Jia-Yi Chen, Hsinchu Hsien (TW); Chao-Tung Yang, Tainan (TW); Chiung Hung Chang, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 2 days.

(21) Appl. No.: 12/344,808

(22) Filed: Dec. 29, 2008

(65) Prior Publication Data

US 2009/0303123 A1 Dec. 10, 2009

(30) Foreign Application Priority Data

Jun. 6, 2008 (TW) .............................. 97121036 A

(51) Int. Cl.
G01S 19/31 (2010.01)
G01S 19/42 (2010.01)
(52) U.S. Cl. .............................. 342/357.71; 342/357.25
(58) Field of Classification Search ............ 342/357.06, 342/357.09, 357.12, 357.13, 357.15; 701/213, 701/215
See application file for complete search history.

(56) References Cited

U.S. PATENT DOCUMENTS

| 5,486,834 | A * | 1/1996 | Lennen ................... 342/357.12 |
| 7,183,971 | B1 * | 2/2007 | Lloyd et al. ............ 342/357.09 |
| 2006/0222058 | A1 * | 10/2006 | Simic et al. ................. 375/150 |
| 2007/0030841 | A1 * | 2/2007 | Lee et al. ..................... 370/352 |

OTHER PUBLICATIONS

"Design of A Single Frequency GPS Software Receiver", by Peter Rinder, et al., published by Aalborg University, 2004, pp. 25-31.

* cited by examiner

*Primary Examiner*—Dao L Phan
(74) *Attorney, Agent, or Firm*—WPAT, PC; Justin King

(57) ABSTRACT

A hybrid Global Positioning System (GPS) receiving method, and associated GPS receiving apparatus is provided. The GPS receiving apparatus includes an RF front-end circuit, a correlation circuit, an acquisition engine and a bidirectional interface control unit. The RF front-end receiving circuit receives a satellite signal and converts the same into a baseband signal. The acquisition engine, coupled to the correlation circuit, determines reception power of the GPS satellite signal. The interface control unit, coupled to the acquisition engine, provides a low-speed interface for transmitting GPS intermediate data that includes a code bin, a frequency bin, navigation data, a local system time and a GPS time. The interface control unit includes a memory interface unit for coupling to a memory.

24 Claims, 4 Drawing Sheets

HYBRID GPS RECEIVING METHOD AND ASSOCIATED APPARATUS

CROSS REFERENCE TO RELATED PATENT APPLICATION

This patent application is based on a Taiwan, R.O.C. patent application No. 097121036 filed on Jun. 6, 2008.

FIELD OF THE INVENTION

The present invention relates to a Global Positioning System (GPS), and more particularly, to a hybrid GPS receiving method, an associated apparatus.

BACKGROUND OF THE INVENTION

Global Positioning System (GPS) is commonly used in positioning and navigation. The prior art provides two solutions for a GPS receiver. In the first solution, a GPS receiver totally applies hardware circuits for performing radio frequency (RF) front-end processing of received GPS satellite signals and calculations for identifying associated GPS satellites. The above GPS receiver needs an exclusive microprocessor and a memory to execute GPS algorithm software in order to generate data such as position, speed and time. However, this solution not only tends to have high manufacturing costs owing to the necessarily exclusive microprocessor and memory, but also yields chips with large areas and little operation flexibility that are unfavorable for integrating into compact portable electronic devices.

Further, the hardware design of a purely hardware GPS receiver is remarkably complicated. In the event that a time-domain solution is applied, for one skilled in the GPS technology, it is known that the time domain correlation calculations may involve 1023 code chips, each of which has a length of 2048. In addition, bits for in-phase signal I, quadrature signal Q, positive/negative sign and amplitude are needed to add up to a total memory space of around 8 mega bits. In the event that a frequency-domain solution is applied, for one skilled in the GPS technology, it is known that correlation calculations in a time domain correspond to multiplications in the frequency domain. However, complex fast Fourier transform (FFT) is needed to first convert samples of time-domain signals to frequency-domain functions, and yet complex inverse fast Fourier transform (IFFT) is then applied to transform the results back to the time domain when frequency-domain multiplications are completed. Taking the 2048 sampling resolution for example, hardware is typically required by 2048*2-point FFT and 2048-point IFFT. Both transformations need huge hardware support such that an area of the chips manufactured cannot be effectively reduced.

In the second solution, a GPS receiver only receives GPS signals and handles RF front-end processing. Subsequent processing such as calculations for identifying GPS satellites and generating data of position, speed and time, is entirely achieved by a high-level microprocessor and a large memory for executing associated software. This software-oriented solution needs to manipulate a great amount of data that adds loading on calculations, storage and power of the GPS receiver. As a result, real-time response, precision, and costs applying this solution are also rather unsatisfactory.

SUMMARY OF THE INVENTION

Therefore, one of the objectives of the invention is to provide a hybrid GPS receiving method, and associated apparatus and system, which are capable of utilizing existing resources of an external host to reduce manufacturing costs as well as reducing a size of the GPS receiving apparatus, which is then advantageous for integrating with a portable electronic device.

Another of the objectives of the invention is to provide a hybrid GPS receiving method, and associated apparatus and system, which are capable of increasing positioning precision by performing operations needed for GPS satellite identification using hardware circuits, and reducing resources designated by an external host for operations, storage and power.

The present invention discloses a GPS receiving apparatus comprising a radio frequency (RF) front-end circuit, a correlation circuit, an acquisition engine, and an interface control unit. The RF front-end circuit receives a GPS satellite signal and converts the same into a digital baseband signal. The correlation circuit, coupled to the RF front-end circuit, generates a correlation result by performing correlation calculations on the digital baseband signal. The acquisition engine, coupled to the correlation circuit, acquires reception power of the satellite signal in a frequency domain according to the correlation result. The interface control unit, coupled to the acquisition engine, provides a low-speed bidirectional interface for transmitting GPS intermediate data, which includes a code bin, a frequency bin, navigation data, a local system time and a GPS time. The interface control unit comprises a memory interface unit for coupling to a random access memory (RAM). The host comprises a microprocessor executing a position, speed, navigation and timing software according to the GPS intermediate data. The interface control unit is coupled to a host via a transmission interface, and the host controls the GPS receiving apparatus to operate in a search mode and a track mode. In the track mode, the host controls the GPS receiving apparatus to operate in the alternative of a closed loop and an open-loop.

The present invention discloses a hybrid GPS system comprising an antenna, a GPS receiving apparatus, and a host having a microprocessor. The GPS receiving apparatus, coupled to the antenna, receives satellite signals and GPS intermediate data. The host is coupled to the GPS receiving apparatus via a low-speed bidirectional transmission interface, whereby the host performs positioning calculations according to the GPS intermediate data using the microprocessor.

The present invention further discloses a GPS receiving method comprising steps of: receiving a GPS satellite signal; converting the GPS satellite signal into a digital baseband signal; performing correlation calculations on the digital baseband signal and a pseudo random code; calculating reception power of the GPS satellite signal to identify a GPS satellite associated with the GPS signal; and generating GPS intermediate data to a host having a microprocessor to position according to the GPS intermediate data. The GPS intermediate data comprises a code bin, a frequency bin, navigation data, a local system time and a GPS time.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
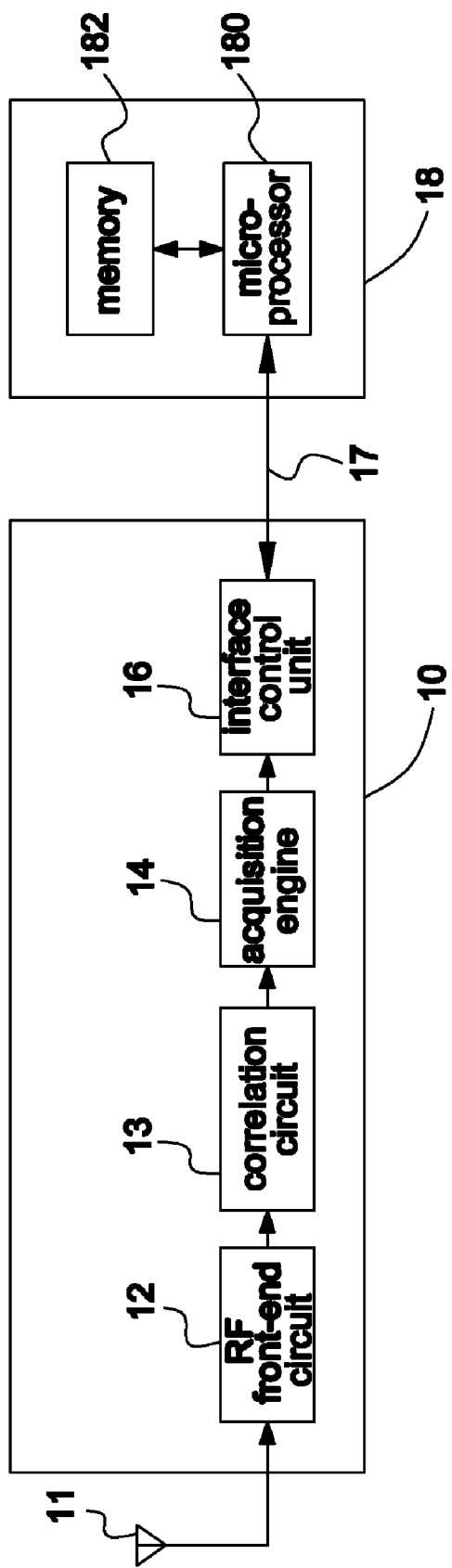
FIG. 1 is a block diagram of a hybrid GPS according to one preferred embodiment of the invention.

FIG. 1 shows a block diagram of a hybrid Global Positioning System (GPS) according to one preferred embodiment of the invention. A GPS receiving apparatus 10 comprises a radio frequency (RF) front-end circuit 12, a correlation circuit 13, an acquisition engine 14, and an interface control unit 16. An antenna 11 receives GPS satellite signals from a plurality of GPS satellites. The RF front-end circuit 12 performs analog amplification, down-conversion and analog-to-digital conversion on the satellite signals to convert the same into digital baseband signals. The correlation circuit 13 performs correlation calculations on the digital baseband signals. The acquisition engine 14 acquires power intensity of the received GPS satellite signals. With iterative operation by the correlation circuit 13 and the acquisition engine 14, the GPS satellites transmitting the GPS satellite signals are identified. Each GPS satellite has a unique spreading code, e.g., a coarse/acquisition (C/A) code, which is respectively included in transmitted GPS signals. Important data generated by the iterative calculations of the correlation circuit 13 and the acquisition engine 14 include a code bin, a frequency bin, navigation data, raw data and a local system time. The correlation circuit 13 performs correlation calculations on each of the digital baseband signals using the code bin and frequency bin. The acquisition engine 14 acquires and tracks satellite signals to lock to valid satellite signals. The navigation data includes satellite information of identified satellites, including almanac and ephemeris, for subsequent positioning operations. Preferably, at least four GPS satellites are identified for the positioning process.

Being controlled by the host 18 via the interface control unit 16, the GPS receiving apparatus 10 selectively transmits GPS intermediate data including the code bin, frequency bin, navigation data, raw material, and local system time to the host 18 via a transmission interface 17. The host 18, comprising a microprocessor 180 and a memory 182, controls hardware operations of the GPS receiving apparatus 10 via the interface control unit 16. When needed, the microprocessor 180 performs positioning calculations according to the GPS intermediate data from the transmission interface 17, as well as controlling the GPS receiving apparatus 10 to perform acquisition and/or tracking operations according to the code bin and frequency bin parameters generated by the GPS receiving apparatus 10. The code bin and frequency bin parameters are extremely important parameters for precision thereof as they have crucial effects on precision of the subsequent positioning operations. For example, the precision of the bin code is preferably within ±½ chip, and that of the frequency bin is preferably within ±500 Hz. According to the structure in FIG. 1, being controlled by the host 18, operations of the GPS receiving apparatus 10 are allowed to achieve the desired precision. The microprocessor 180 then performs positioning calculations. Based on the navigation data and local system time of reliable GPS intermediate data, distances from the GPS receiving apparatus 10 to the identified GPS satellites are measured, and accurate positioning, speed test, navigation, or timing, is proceeded according to the measurements obtained. The memory 182, such as a random access memory (RAM), a read-only memory (ROM), a flash memory, or any suitable data storage medium, provides storage space needed by operations of the microprocessor 180, and storage space needed by firmware for measurement and positioning calculations by the microprocessor 180. The host 18 comprises a microprocessor executing a position, speed, navigation and timing software according to the GPS intermediate data.

According to the structure in FIG. 1, the GPS receiving apparatus 10 shares resources of the host 18, including e.g., the microprocessor 180 and the memory 182, with the host 18 so as to accurately perform positioning while also reducing hardware costs. In other words, resources of the host 18 are not designated solely for GPS operations but may serve other purposes based on designs of the host 18. For example, the host 18 may be, but not limited to, a portable electronic device such as a mobile phone, a PDA, or a laptop, and the microprocessor 180 and the memory 182 are intrinsic components of the portable electronic device. Utilizing the correlation circuit 13 and the acquisition engine 14, the GPS receiving apparatus 10 performs huge amounts of iterative calculations on correlation, acquisition and tracking of satellite signals to significantly reduce a data amount transmitted back and forward between the GPS receiving apparatus 10 and the host 18. Therefore, the transmission interface 17 may be a low-speed bidirectional transmission interface adopted by the microprocessor 180. The low-speed bidirectional transmission interface may be, but not limited to, such as a Serial Peripheral Interface (SPI), a Universal Asynchronous Receiver/Transmitter (UART) interface, an Inter-Integrated Circuit (I²C) interface, a general purpose input/output (GPIO) interface, or a direct memory access (DMA) interface. Hence, the structure in FIG. 1 may be implemented to various microprocessor platforms to achieve desired positioning precision.

Preferably, the microprocessor 180 sends out a control signal to the interface control unit 16 via the transmission interface 17 to control operations of the GPS receiving apparatus 10, e.g., to activate or deactivate the GPS receiving apparatus 10, or to prompt the GPS receiving apparatus 10 to enter or wake up from a sleep mode.

Figure 2:
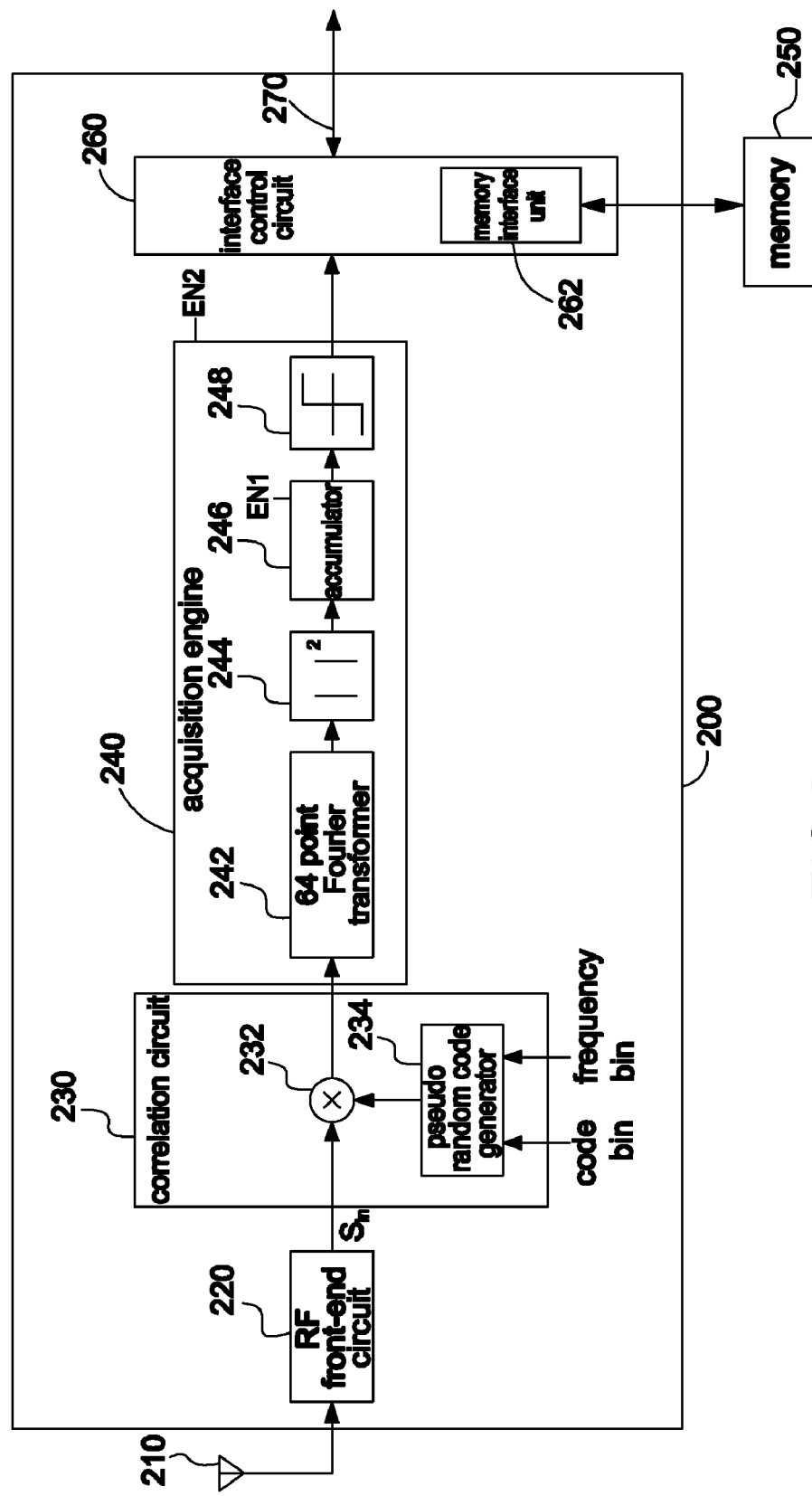
FIG. 2 is a detailed circuit diagram of a GPS receiving apparatus according to one preferred embodiment of the invention.
Figure 3:
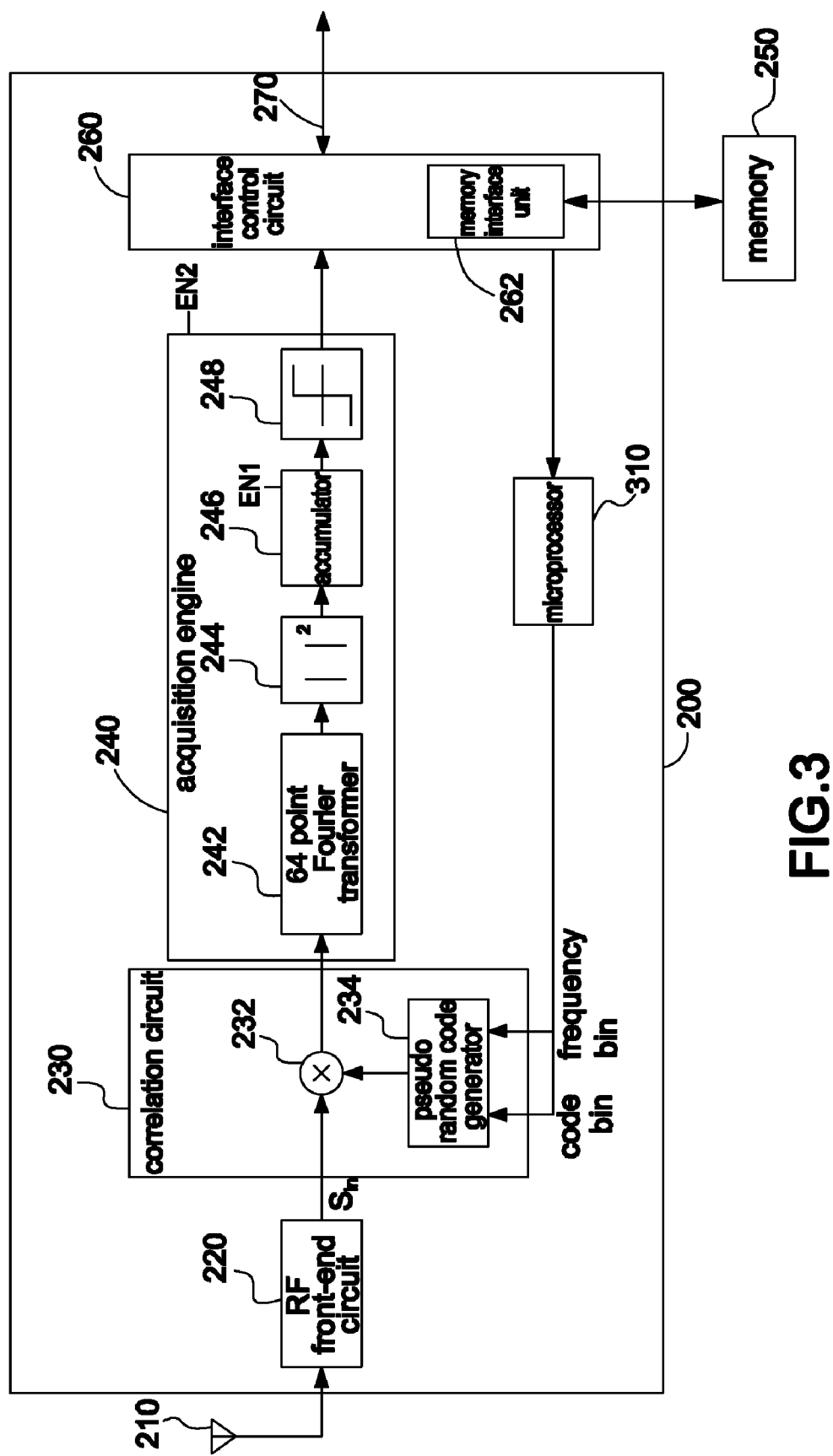
FIG. 3 is a circuit diagram of the GPS receiving apparatus operating in a closed loop.

FIG. 2 shows a detailed circuit diagram of a GPS receiving apparatus 200 according to one preferred embodiment of the invention. The GPS receiving apparatus 200 comprises an RF front-end circuit 220, a correlation circuit 230, an acquisition engine 240, and an interface control unit 260. An antenna 210 receives a plurality of satellite signals from a plurality of satellites. The RF front-end circuit 220 performs analog amplification, down-conversion and analog-to-digital conversion on the satellite signals to convert the same into digital baseband signals $S_{in}$. The correlation circuit 230 performs correlation calculations according to the digital baseband signals $S_{in}$. The acquisition engine 240 identifies the GPS satellites according to iterative calculations according to correlation results. The correlation circuit 230 comprises a correlator 232 and a pseudo random code generator 234. The pseudo random code generator 234 receives code bins and frequency bins to provide corresponding pseudo random codes, which are also referred to as C/A codes, for the correlator 232 to perform correlation calculations on the baseband signals $S_{in}$. Preferably, the GPS receiving apparatus 200 comprises a plurality of identical correlation circuits 230 to perform respective correlation calculations on the plurality of GPS satellites. In this embodiment, the acquisition engine 240 acquires reception power of the satellite signals. The acquisition engine 240 comprises a 64-point Fourier transformer 242, a power calculator 244, an accumulator 246, and a threshold detector 248. Correlation results generated by the correlation circuit 230 are sent to the Fourier transformer 242 to transform the correlation results from a time domain to a frequency domain. The power calculator 244 squares the frequency-domain results to obtain the reception power of the satellite signals. The accumulator 246 may be enabled or disabled by an enable signal EN1. When the accumulator 246 is enabled, power from multiple receptions of the satellite signals is accumulated to improve reception power of weak satellite signals. When the accumulator 246 is disabled, the acquisition engine 240 calculates power from a single reception of the satellite signals. Via the threshold detector 248, the reception power of the satellites within a predetermined range is detected to determine whether it exceeds a threshold, and a detection result is stored into a memory 250 via a memory interface unit 262. The memory 250 may be a RAM, a flash memory, a static random access memory (SRAM), or any suitable data storage medium; and data in the memory 250 may be accessed using DMA. Preferably, the GSP receiving apparatus 200 and the memory 250 are integrated into an integrated circuit (IC); the interface control unit 260 provides a host (not shown) for accessing and observing the calculation result of the GPS receiving apparatus 200, and for controlling the operation modes of the GPS receiving apparatus 200. The hardware circuit complexity may be further reduced using the circuit structure of the GPS receiving apparatus 200 according to the present invention. Generally, to achieve high GPS positioning precision, a typical GPS receiving circuit requires two independent engines, namely a search engine and a track engine, as well as a Fourier transformer of as high-end as 2048*2-point. High GPS positioning precision is expected to have a code bin precision of within ±½ chip, and a frequency bin precision of within ±500 Hz. The circuit structure of the GPS receiving apparatus 200 is capable of realizing operations of the two engines of a search engine and a track engine. For example, a host (not shown) first commands the GPS receiving apparatus 200 to operate in a search mode. In the search mode, the GPS receiving apparatus 200 calculates power of a satellite signal having a code bin and a frequency bin, determines whether a corresponding satellite signal is present according to intensity of the power calculated, and stores the code bin and frequency bin corresponding to the power of the correct satellite signal. After a predetermined duration, via the interface control unit 260, the host (not shown) accesses the stored code bin and frequency bin, and determines whether the stored code bin and frequency bin are correct and reliable. Within the predetermined duration, the host (not shown), e.g. a mobile phone, may proceed with tasks originally designed to perform. Preferably, the GPS receiving apparatus 200, with the aid of the 64-bit Fourier transformer while disabling the accumulator 246 by the enable signal EN1, quickly locates approximate positions of the code bin and the frequency bin of the satellite. When the host (not shown) determines that the code bin and frequency bin are correct and reliable, the GPS receiving apparatus 200 is commanded to operate in a track mode via the interface control unit 260. For example, the GPS receiving apparatus 200 disables the acquisition engine 240 using an enable signal EN2, and performs a closed loop to fine tune the code bin and the frequency bin by directly using output data from the correlation circuit 230. That is, the acquisition engine 240 directly bypasses output of the correlation circuit 230. In other words, the approximate positions of the code bin and the frequency bin have been roughly located by the GPS receiving apparatus 200 under a search mode, and precision of the code bin and the frequency bin is fine tuned under a track mode to further increase satellite positioning precision. To fine tune the precision of the code bin and the frequency bin under a track mode, power distribution of the satellite signal is calculated in small regions using small scales. For example, precision of the code bin is within ±½ chip, and precision of the frequency bin is within ±500 Hz. FIG. 3 shows a block diagram of the GPS receiving apparatus 200 in a closed loop by cooperating with a microprocessor 310. In the aforesaid embodiment, after the search mode, precision of the code bin falls within ±½ chip, and precision of the frequency bin falls within ±500 Hz. The host (not shown) then prompts the GPS receiving apparatus 200 to operate in a track mode via the interface control unit 260. At this point, the microprocessor 310 may feed three code bin values represented within a range of ±½ chip into the correlation circuit 230. The acquisition engine 240 is disabled by the enable signal EN2 such that the acquisition engine 240 directly bypasses output of the correlation circuit 230 to store the correlation result into the memory 250. Via the interface control unit 260, the microprocessor 310 retrieves and analyzes the calculation result from three code bin values within the range of ±½ chip to update the code bins and the frequency bins. The closed loop operates to lock the code bin and frequency bin to eventually generate accurate code bin and frequency bin results. The microcontroller 310 may be an 8051 microprocessor, for example. It is to be noted that, according to the present invention, the microprocessor 310 is satisfied using a low-end but not an exclusive, high-end microprocessor as for the prior art in order to complete related tasks.

Under the track mode, the host (not shown) monitors an operation status of the GPS receiving apparatus 200 via the interface control unit 260. For example, the host (not shown) reads a variance associated with the code bin and frequency bin via the interface control unit 260 to determine precision of the satellite positioning. The code bin and frequency bin are determined as to have failed precision requirements when the variance exceeds a predetermined threshold. Further, via the interface control unit 260, the host (not shown) may command the GPS receiving apparatus 200 to operate in an open-loop. More specifically, the GPS receiving apparatus 200 enables the accumulator 246 via the enable signal EN1 to operate in the open-loop. The open-loop operation is greatly favorable for environments where satellite signals are weak, such as cafeterias in the midst of skyscrapers in metropolitan areas. When the host (not shown) becomes aware that positioning precision of the GPS receiving apparatus 200 is below expectation, it commands the GPS receiving apparatus 200 to switch from the closed-loop to the open-loop via the interface control unit 260. In the open-loop, intensity distribution of satellite signal is again observed in larger scales, while the iterative number of power accumulation of the accumulator 246 may be appropriately set to significantly elevate positioning sensitivity in environments where satellite signals are weak.

In this embodiment, the GPS receiving apparatus 200 provides a concise GPS receiving circuit structure, and can be controlled by the host (not shown) via the transmission interface 270 to flexibly operate between search and track modes. Also, the host (not shown) may access important data of the GPS receiving apparatus 200 via the transmission interface 270 and the interface control unit 260. It is to be noted that the transmission interface 270 according to the invention may be implemented using a low-speed transmission interface, such as but not limited to an SPI interface, a UART interface, an I$^2$C interface, a GPIO interface or a DMA interface. In addition, the host (not shown) may command the correlation circuit 230 of the GPS receiving apparatus 200 to dump the correlation result, which is read by the host. The host (not shown) observes raw data in a time domain to analyze satellite signals if needed. The host (not shown) comprises a microprocessor executing a position, speed, navigation and timing software according to the GPS intermediate data. The host (not shown) controls the GPS receiving apparatus 200 to operate in a search mode and a track mode. Further, in the track mode, the host (not shown) controls the GPS receiving apparatus 200 to operate in a closed loop or an open-loop.

In the following description, how the circuit structure of the GPS receiving apparatus 200 simplifies the hardware of a Fourier transformer while achieving high positioning precision shall be elaborated. In this embodiment, the 64-point Fourier transformer 242 is implemented but it is not meant to be a limitation on the scope of the invention. The number of Fourier transformers may be simplified based on an overall hardware structure of the GPS receiving apparatus 200, as to be described below. Supposing an $N_r$-point Fourier transformer is to be applied for realizing code bin precision of $\pm\frac{1}{2}$ chip and frequency bin precision of $\pm 500$ Hz:

$$f_r = f_{ss}/N_r \quad \text{formula 1}$$

$$f_s/N_s = f_{ss}/N_{ss} \quad \text{formula 2}$$

$$N_r/N_{ss} = T \quad \text{formula 3}$$

Wherein, $f_r$ is the frequency resolution, $f_{ss}$ the sub-sampling frequency per millisecond, $f_s$ is the sampling frequency of the analog front-end circuit, $N_s$ is the sampling number corresponding to the sampling frequency $f_s$, $N_{ss}$ is the sub-sampling number corresponding to the sub-sampling frequency $f_{ss}$, and T is the time needed by the sampling number $N_r$-point in millisecond. During circuit design of the GPS receiving apparatus 200, hardware specifications is defined according to requirements to achieve positioning precision desired. Taking satellite positioning involving 1024 chips for example, a cycle is one millisecond, and code bin precision is within $\pm\frac{1}{2}$ chip; that is, $N_s$ is 2048 samples, the sampling frequency $f_s$ is 2.048 MHz, the frequency resolution $f_r$ is 500 Hz, and $N_r$ represents a 64-point Fourier transformer. According to formulas 1, 2 and 3, it is obtained that $f_{ss}$=32 KHz, $N_{ss}$=32 points, and T=2 milliseconds. The GPS receiving apparatus 200 may be designed accordingly with such specifications. That is, by using the 64-point Fourier transformer, positioning precision is achieved with the code bin precision being within $\pm\frac{1}{2}$ chip, and the frequency bin being within $\pm 500$ Hz. The analog front-end circuit samples analog signals and generates data with a sampling frequency of $f_s$=2.048 MHz. For example, a down converter (not shown) can be applied to accurately down-convert originally higher frequency sampling data to 2.048 MHz data, meaning that 2048 samples $N_s$ are produced per millisecond, the corresponding sub-sampling frequency $f_{ss}$ is 32 KHz, and the sub-sampling number $N_{ss}$ per millisecond is 32 points to represent that 32 sub-samples are generated per millisecond under such hardware structure. In this embodiment, $N_r$=64 points, and thus 64 sub-samples are generated within T=$N_r/N_{ss}$=2 milliseconds. For example, as shown in FIG. 2, the data frequency $f_s$ of the baseband signals $S_{in}$ sampled by the GPS receiving apparatus 200 is 2.048 MHz. Every two milliseconds, the correlation circuit 230 generates 64 sampling correlation results, and the acquisition engine 240 performs frequency-domain transformation on the 64-point correlation results using the 64-point Fourier transformer 242 to achieve the desired positioning precision, which has the code bin precision being within $\pm\frac{1}{2}$ chip, and the frequency bin precision being within $\pm 500$ Hz.

Figure 4:
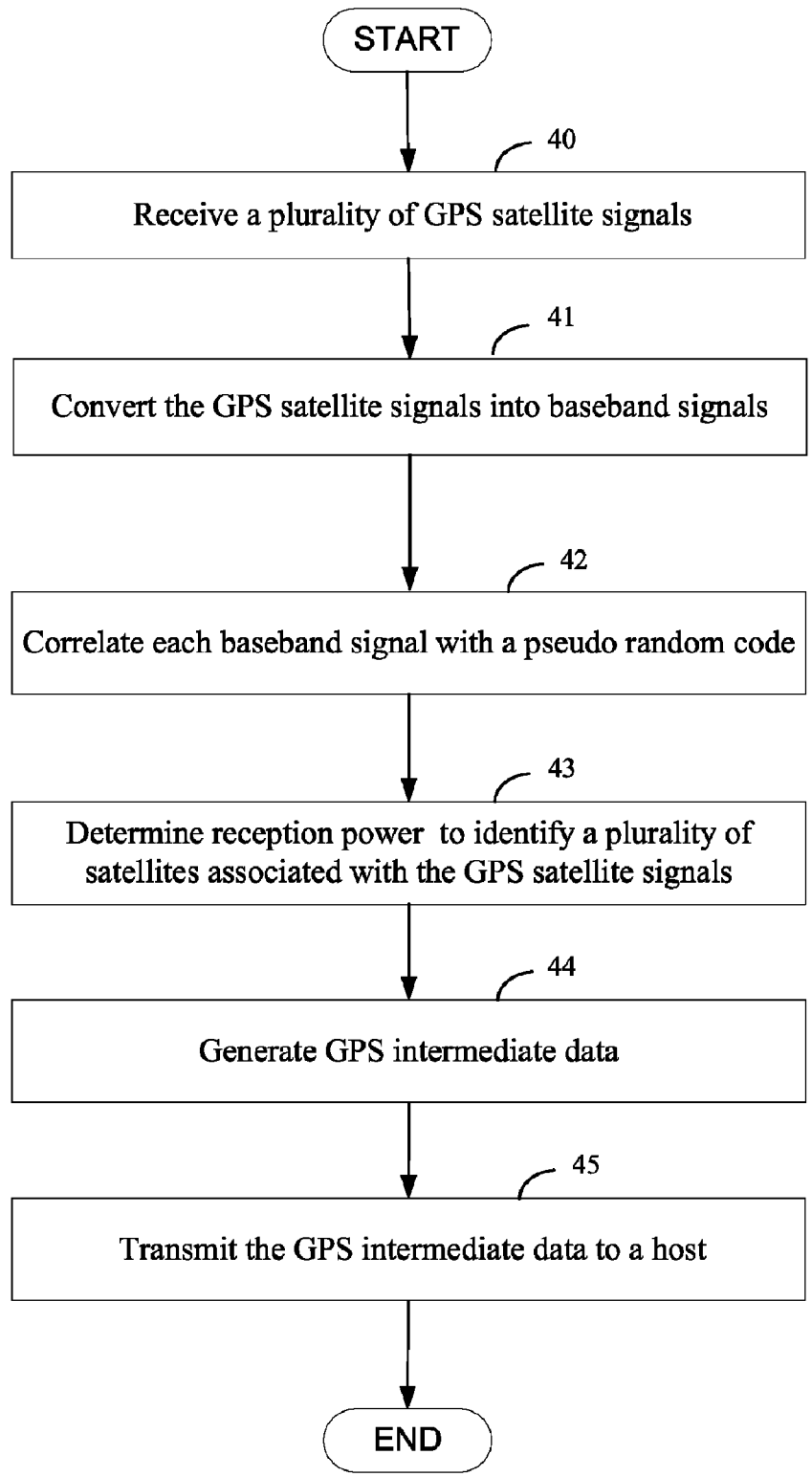
FIG. 4 is a flowchart of a GPS receiving method according to one preferred embodiment of the invention.

FIG. 4 shows a flowchart of a GPS receiving method according to one preferred embodiment of the present invention. At Step 40, a plurality of GPS satellite signals are received. At Step 41, the GPS satellite signals are converted into digital baseband signals. At Step 42, correlate each digital baseband signal with a pseudo random code. At Step 42, reception power is determined by Fourier transform according to correlation results obtained to identify a plurality of satellites associated with the GPS satellite signals. At Step 44, GPS intermediate data including a code bin, a frequency bin, navigation data, raw data, a local system time and a GPS time is generated. At Step 45, in response to a request command, the GPS intermediate data is transmitted to a host via a bidirectional transmission interface, which may be but not limited to an SPI interface, a UART interface, an $I^2C$ interface or a DMA interface.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A Global Positioning System (GPS) receiving apparatus, fabricated on a single silicon, comprising:
    a radio frequency (RF) front-end circuit, for receiving a GPS satellite signal and converting the same into a digital baseband signal;
    a correlation circuit, coupled to the RF front-end circuit, for receiving the digital baseband signal and performing correlation calculations on the digital baseband signal to generate a correlation result;
    an acquisition engine, coupled to the correlation circuit, for receiving the correlation result and acquiring reception power of the satellite signal according to the correlation result; and
    a bidirectional interface control unit, coupled to the acquisition engine, for transmitting GPS intermediate data, wherein, the correlation circuit and the acquisition engine operate in the alternative of a closed-loop and an open-loop.

2. The GPS receiving apparatus according to claim 1, wherein the GPS intermediate data is generated according to the correlation result and the reception power of the satellite signal.

3. The GPS receiving apparatus according to claim 1, wherein the GPS intermediate data comprises a code bin, a frequency bin, navigation data, a local system time and a GPS time.

4. The GPS receiving apparatus according to claim 3, wherein the navigation data comprises an almanac and an ephemeris.

5. The GPS receiving apparatus according to claim 1, wherein the correlation circuit comprises a correlator and a pseudo random code generator,
    wherein the correlator is coupled to the pseudo random code generator, the pseudo random code generator generates a pseudo random code according to a code bin and a frequency bin, and the correlator receives the baseband signal and the pseudo random code to perform correlation calculations to generate the correlation result.

6. The GPS receiving apparatus according to claim 1, wherein the acquisition engine comprises:
    a Fourier transformer, for performing Fourier transform on the correlation result; and
    a power calculator, coupled to the Fourier transformer, for calculating reception power of the satellite signal.

7. The GPS receiving apparatus according to claim 6, wherein the acquisition engine further comprises:
   an accumulator, coupled to the power calculator, for accumulating the reception power of the satellite signal; and
   a threshold detector, coupled to the accumulator, for determining whether the accumulated reception power exceeds a threshold.

8. The GPS receiving apparatus according to claim 7, wherein the accumulator can be selectively enabled by an enable signal.

9. The GPS receiving apparatus according to claim 7, wherein the acquisition engine can be selectively enabled by an enable signal.

10. The GPS receiving apparatus according to claim 1, wherein the interface control unit is coupled to a host via a bidirectional transmission interface, and the host controls the GPS receiving apparatus to operate in a search mode and a track mode.

11. The GPS receiving apparatus according to claim 10, wherein the transmission interface is one of: a Serial Peripheral Interface (SPI), a Universal Asynchronous Receiver/Transmitter (UART) interface, an Inter-Integrated Circuit (I2C) interface, a general purpose input/output (GPIO) interface, and a direct memory access (DMA) interface.

12. The GPS receiving apparatus according to claim 10, wherein the host comprises a microprocessor for executing a positioning software according to the GPS intermediate data.

13. The GPS receiving apparatus according to claim 10, wherein the host activates or deactivates the GPS receiving apparatus via the transmission interface.

14. The GPS receiving apparatus according to claim 10, wherein the host prompts the GPS receiving apparatus to enter a sleep mode via the transmission interface.

15. The GPS receiving apparatus according to claim 10, wherein the host is a portable electronic device.

16. The GPS receiving apparatus according to claim 10, wherein the host comprises a microprocessor executing a position, speed, navigation and timing software according to the GPS intermediate data.

17. The GPS receiving apparatus according to claim 10, wherein, in the track mode, the host controls the GPS receiving apparatus to operate in the alternative of a closed loop and an open-loop.

18. The GPS receiving apparatus according to claim 1, wherein the interface control unit comprises a memory interface unit for coupling to a memory.

19. The GPS receiving apparatus according to claim 1, wherein the acquisition engine acquires reception power of the satellite signal in a frequency domain.

20. A Global Positioning System (GPS) receiving method, comprising steps of:
   receiving a plurality of GPS satellite signals;
   converting the GPS satellite signals into a plurality of baseband signals;
   correlating each baseband signal with a pseudo random code;
   identifying a plurality of GPS satellites associated with the GPS satellite signals;
   generating GPS intermediate data; and
   transmitting the GPS intermediate data via a bidirectional transmission interface to a host in response to a command from the host for positioning according to the GPS intermediate data.

21. The GPS receiving method as claimed in claim 20, wherein the GPS intermediate data comprises a code bin, a frequency bin, navigation data, a local system time, and a GPS time.

22. The GPS receiving method as claimed in claim 21, wherein the navigation data comprises an almanac and an ephemeris.

23. The GPS receiving method as claimed in claim 20, wherein the bidirectional transmission interface is one of: a Serial Peripheral Interface (SPI), a Universal Asynchronous Receiver/Transmitter (UART) interface, an Inter-Integrated Circuit (I2C) interface, a general purpose input/output (GPIO) interface, and a direct memory access (DMA) interface.

24. The GPS receiving method as claimed in claim 20, further comprising a step of transmitting the GPS intermediate data to the host having a microprocessor to perform a positioning calculation, a speed calculation, a navigation calculation, and a timing calculation according to the GPS intermediate data using the microprocessor.

* * * * *